Feb. 13, 1962 J. BOWMAN 3,021,399
TIMER CONTROL STRUCTURE
Filed Aug. 31, 1960 2 Sheets-Sheet 1

Inventor
Joe Bowman
by  Attys.

Inventor
Joe Bowman

United States Patent Office 3,021,399
Patented Feb. 13, 1962

3,021,399
TIMER CONTROL STRUCTURE
Joe Bowman, Greentown, Ind., assignor to Kingston Products Corporation, Kokomo, Ind., a corporation of Indiana
Filed Aug. 31, 1960, Ser. No. 53,152
14 Claims. (Cl. 200—38)

This invention relates generally to an electrical switch structure, and more specifically to improved timer control structure adapted for use on an appliance timer.

Although the principles of the present invention may be included in various timers, a particularly useful application is made in timers of the type employed to control the various circuits and functions of an automatic washing machine of the domestic type.

The instant invention represents a practical embodiment of a substantial improvement to a timer disclosed in the United States patent to A. R. Constantine No. 2,703,347, issued March 1, 1955. While certain novel features have been disclosed herein, it will be apparent that the problems which they solve are also present in other timers and that such structures may be incorporated in such other timers. Therefore, it is to be understood that the disclosure of certain of the features herein in connection with the Constantine timer is not to be construed as a limitation.

In recent years, an ever increasing number of features and functions have been added to modern automatic washing machines. These functions are normally electrically controlled and operated in accordance with a program of operation established by the washing machine manufacturer. The disclosed embodiment incorporates novel structure by which a timer is provided with the means for carrying out a number of functions and combinations thereof.

It is well known in the timer art that a timer may be so constructed that an axial shift of its shaft may be employed to operate a switch which serves as a master switch to effect starting and stopping of the controlled device as a whole. As devices to be controlled become more complex, there arises a requirement for additional circuits, and eventually a point is reached where there is an insufficient number of sequence-cam operated switches in the timer. Typically, one of the cam-operated circuits is employed to shut down the timer motor at the end of a timing cycle. Accordingly, it is an object of the present invention to provide structure by which the master switch may be employed to stop the timer motor at the end of a timing cycle, thereby making available an additional circuit-controlling switch which is operated by the sequence cam for controlling another circuit.

It is known that excessive tub vibration is caused by an excessive unbalance in the disposition of the contents, and heretofore such tub vibration has been harnessed to effect timer shut-down and hence a stoppage of the controlled device. Accordingly, it is a further object of the present invention to provide shaft control structure which is responsive to such an outside force and which is operative to shift the shaft to effect opening of the master switch of the timer.

A still further object of the present invention is to provide improved structure for retaining a detent spring.

Yet another object of the present invention is to provide unified structure for incorporating a plurality of features into a timer embodiment.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 1:
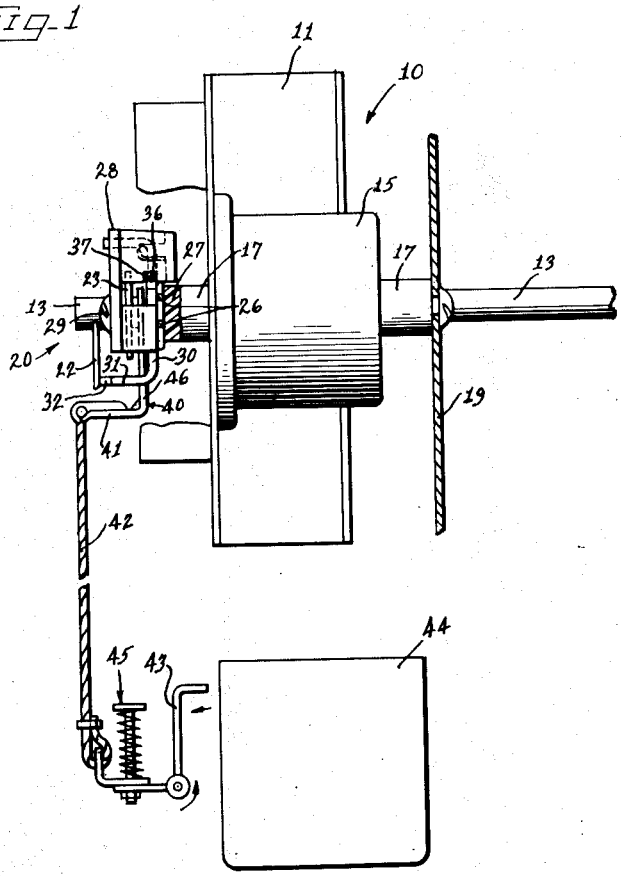
FIGURE 1 is an end view of an appliance timer provided with novel structure in accordance with the principles of the present invention, the timer being partially broken away for purposes of clarity, and the washing machine tub being shown diagrammatically.
Figure 4:
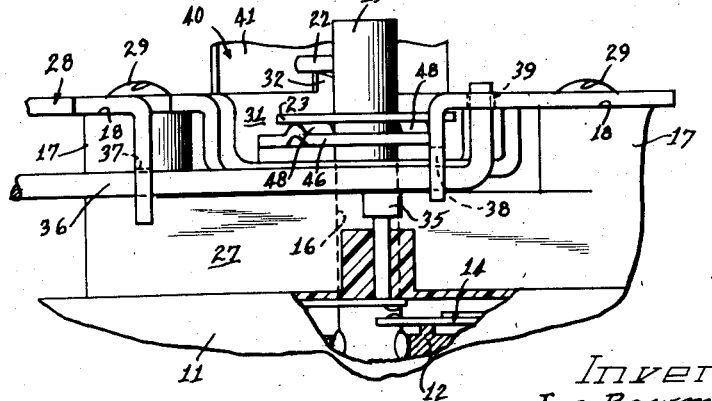
FIGURE 4 is an enlarged fragmentary elevational view taken generally along line IV—IV of FIGURE 2, certain details being broken away and sectioned.

The principles of this invention are particularly useful when embodied in a multiple switch or timer assembly such as illustrated in FIGURE 1, generally indicated by the numeral 10. The timer assembly includes a housing 11, in which there is disposed a program timing or sequence cam 12 illustrated fragmentarily in FIGURE 4, and which has a drive connection with a timer shaft 13. The sequence cam 12 controls the operation of a plurality of electrical switches, one of which is illustrated in FIGURE 4 and identified at 14. The timer 10 includes a motor 15 which is provided with a drive mechanism of a known type (not shown) for rotating the timing sequence cam 12.

The housing 11 is apertured as at 16 (FIGURES 3 and 4) in the sides thereof, the apertures 16 receiving and supporting the timer shaft 13 for both rotation and for axially slidable movement. Each side of the housing is provided with a pair of bosses 17 disposed on opposite sides of the aperture 16, each of the bosses 17 having an outwardly directed support surface 18 adjacent to the aperture 16. One pair of bosses 17 is secured to a mounting plate 19 forming a part of the device to be controlled, the shaft 13 extending therethrough for manual access.

The other end of the timer shaft 13 is provided with a shaft control structure 20 indicated generally in FIGURE 1, the details of which comprise features of the instant invention.

Figure 3:
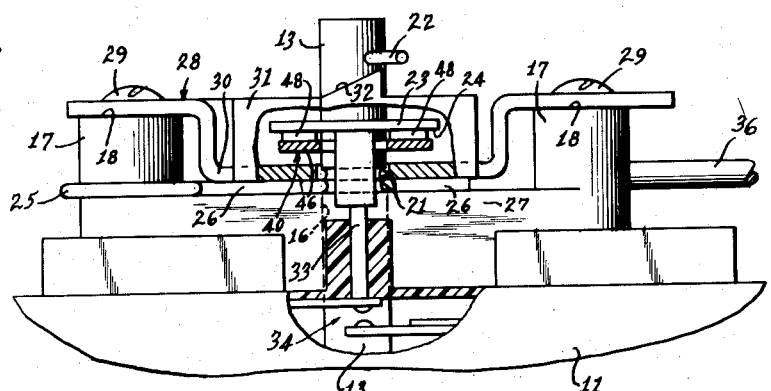
FIGURE 3 is an enlarged fragmentary elevational view taken generally along line III—III of FIGURE 2, certain details being broken away and sectioned.

As best seen in FIGURE 3, the timer shaft 13 is provided with a number of axially directed cam shoulders 21 which define a pair of circumferential recesses. The shaft 13 is further provided with a radially projecting pin or projection 22 and an annular plate 23 rigidly secured to the shaft 13, and defining an axially directed shoulder 24. A generally U-shaped spring 25 extends about one of the bosses 17, and has a pair of fingers which engage tangentially in the shaft recesses defined by the cam shoulders 21. The fingers of the spring 25 are indicated at 26, 26, and are yieldable radially of the shaft 13 to define a pair of axially spaced shaft positions. The fingers 26 engage against a portion 27 of the housing 11, particularly when one of the cam shoulders 21 of the shaft 13 forces it in such direction.

Figure 5:
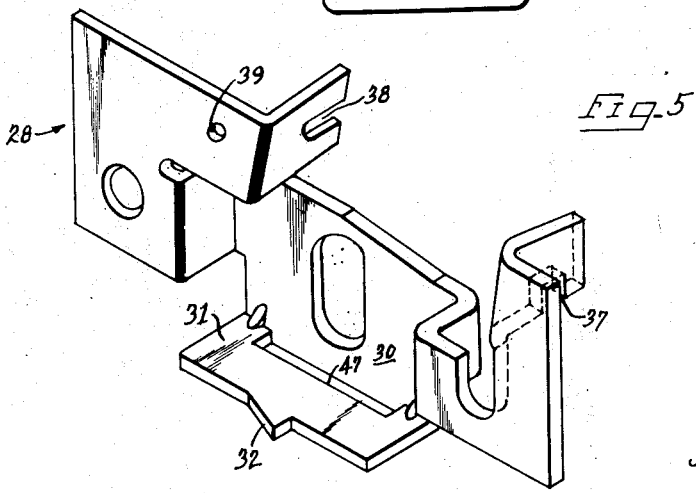
FIGURE 5 is an enlarged perspective view of a multipurpose member employed in FIGURES 1-4.

A rigid retaining member 28, shown in detail in FIGURE 5, is secured as by screws 29 to the support surfaces 18, and includes a generally U-shaped abutment portion 30 which extends between the support surfaces 18, 18, and which is engageable with the fingers 26, 26 of the spring 25 to preclude movement of the spring fingers 26 in a direction away from the housing 11, namely in a direction parallel to the axis of the shaft 13.

The U-shaped abutment portion 30 has a lateral extension which is directed generally parallel to the legs of the U-shape, the extension being indicated at 31, an integral portion of which defines a rigid cam track 32 which is disposed in the rotational path of the pin 22 when the shaft 13 is in an inner position, the shaft 13 being shown in an outer position in FIGURE 3. When the shaft 13 is rotated in a normal direction, the pin or projection 22 engages the cam track 32 which reacts therewith to shift the shaft 13 outwardly from a first axial shaft position to a second axial shaft position as illustrated. Such axial shaft movement also moves the shoulder 24, thereby enabling a plunger means 33 which is operatively associated with the shoulder 24 and which is responsive to axial movement thereof to permit a switch or switch means 34 to open. In a typical embodiment, the switch means 34 comprises a master switch. It is apparent that when the shaft 13 is manually moved in the opposite direction, the shoulder 24 acting through the plunger means 33 effects closing of the switch 34. Thus the master switch 34 not only is manually controllable, but is actuated in response to shaft rotation to terminate timer operation at a preselected point such as the end of the cycle.

Referring now to FIGURE 4, the purpose of the switch 14 will be explained. Whenever the cam 12 positions the lower element of the switch 14 to an upper or raised position, as shown, the upper element of the switch may be actuated by a plunger 35, the movement of which is under the control of an elongated operating lever 36. The bracket 28 is provided with a slot 37 which defines a fulcrum for the lever 36, and a slot 38 and aperture 39 which serve to guide the lever 36. Remotely from the guided end of the lever 36, there is provided an additional cam track 40 which is rotated by the motor 15 and which is engaged by the lever 36 to effect a more or less continual cycling of the plunger 35. The switch 14 may then be employed, for example in a rinse circuit of a washing machine, whenever the sequence cam 12 calls for such a function to occur. It is to be noted that the means which defines the fulcrum slot 37, and the guide slot and aperture 38, 39, forms an integral part of the bracket 28, whereby the bracket or retaining member 28 serves a number of related functions.

A further function effected by the bracket 28 is that of providing an abutment remotely from the spring 25 on which a bell-crank 40, best seen in FIGURE 1, may pivot. The bell-crank 40 includes a first arm 41 to which is secured a cable 42 which is operatively connected with a second bell-crank 43. The bell-crank 43 is engageable by a washing machine tub 44 when it vibrates by an excessive amount in the direction indicated by the arrow, thus effecting pivoting of the bell-crank 43 as indicated by a second arrow. The bell-crank 43 acts through a nut, bolt, and spring arrangement 45 to transmit a force to the cable 42 in the nature of a tension which is normal to the axis of the shaft 13. The spring in the arrangement 45 isolates the timer 10 from shock movements inherent in a badly vibrating tub, and also takes up excess travel in the bell-crank 43.

Figure 2:
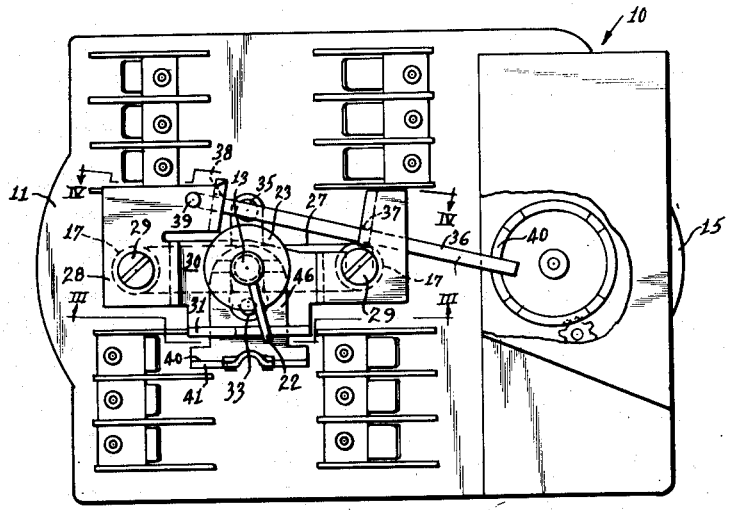
FIGURE 2 is an elevational view of the timer shown in FIGURE 1.

The other arm 46 of the bell-crank 41 is pivoted by the abutment portion 30 of the member 28 and to this end, the lateral extension 31 is provided with an aperture 47 through which the arm 46 projects. The arm 46 is apertured and receives the shaft 13 therethrough so that the bell-crank 40 hangs on or is supported by the shaft 13. The arm 46 extends between the shaft shoulder 24 and the abutment 30 as best seen in FIGURES 3 and 4, and is provided with a bearing portion 48 which engages the shoulder 24 on either side of the shaft 13. As best seen in FIGURE 2, the aperture in the arm 46 is elongated so as to permit the plunger means 33 to pass therethrough.

When an excessive tub vibration effects an application of a force to the bell-crank 40, the bearing portions 48 thereof act directly against the shoulder 24 to shift the shaft 13 in a direction which opens the switch 34. Since the shoulder 24 is annular, it is apparent that the novel shaft-control structure will be responsive to application of such a force to the bell-crank 40 at any point during the timing cycle, while the pin 22 is responsive to a reactive force from the cam track 32 only at a selected point in the cycle. Nevertheless, the shaft may be shifted by a force arising solely from either of these structures, or from a combination thereof. At any event, excessive tub vibration thus will shift the shaft 13 axially from the first position where the master switch 34 is closed, to the second shaft position by which shift the master switch 34 is opened.

It is particularly noteworthy that the unitary rigid member 28 serves to retain the spring 25, to pivotally support and guide the lever 36, to react through the cam track 32 on the pin or radial projection 22 for shifting the shaft 13 axially at a preselected angular position, and also to provide a fulcrum at the edge of the abutment portion 30 thereof for effecting pivoting of the bell-crank 40. A degree of adjustability, particularly for the elongated lever 36, is also provided in that the mounting aperture adjacent to the fulcrum 37 is slotted, as best seen in FIGURE 5.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A shaft-control structure comprising in combination: a housing having a shaft aperture extending through a side thereof, said housing having a pair of raised outwardly directed support surfaces adjacent to said aperture and disposed on opposite sides thereof; a shaft reciprocably disposed in said aperture and having at least one axially directed cam shoulder defining a circumferentially directed recess; a spring carried by said housing and having at least one resilient finger tangentially receivable in said recess, said finger being yieldable radially of said shaft in response to axial movement thereof; and a retaining member secured against said support surfaces, said member having a generally U-shaped abutment portion extending between said support surfaces and engageable at the closed end of the U-shape with said spring in a direction parallel to the axis of said shaft for retaining said spring against movement parallel to the shaft axis.

2. A shaft-control structure for a timer comprising in combination: a sequence cam; a rotatably-supported axially-slidable timer shaft having a driving connection with the sequence cam for joint rotation; switch means operatively associated with said shaft and responsive to axial movement thereof; a pin fixedly secured to said timer shaft for rotation therewith and extending radially therefrom; and a fixedly supported rigid member having a rigid cam track disposed in the path of said pin and engageable with said pin when said timer shaft is in a first axial position, and operative thereon in response to shaft rotation to shift said timer shaft to a second axial position, for thereby operating said switch means.

3. A shaft-control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; said shaft having at least one axially directed cam shoulder defining a circumferentially directed recess; a spring carried by said housing and having at least one resilient finger tangentially receivable in said recess, said finger being yieldable radially of said shaft in response to axial movement thereof;

switch means operatively associated with said shaft and responsive to axial movement thereof; a pin fixedly secured to said timer shaft for rotation therewith and extending radially therefrom; and a fixedly supported rigid retaining member secured against said support surfaces, said member having a generally U-shaped abutment portion extending between said support surfaces and engageable at the closed end of the U-shape with said spring in a direction parallel to the axis of said shaft for retaining said spring against movement parallel to the shaft axis, said U-shaped abutment having an integral rigid cam track disposed in the path of said pin and engageable with said pin when said timer shaft is in a first axial position, and operative thereon in response to shaft rotation to shift said timer shaft to a second axial position, for thereby operating said switch means; said finger being received in said recess to define one of said axial shaft positions.

4. A shaft-control structure for a timer comprising in combination: a sequence cam; a rotatably-supported axially-slidable timer shaft having a driving connection with the sequence cam for joint rotation; means on said timer shaft defining an axially directed shoulder; a switch having means operatively associated with said shoulder and responsive to axial movement thereof for operating said switch in response to axial movement of said shaft; and means responsive to an external force and operatively engageable with said shoulder for shifting said shaft axially from a first to a second shaft position for thereby operating said switch.

5. A shaft-control structure for a timer comprising in combination: a sequence cam; a rotatably-supported axially-slidable timer shaft having a driving connection with the sequence cam for joint rotation; means on said timer shaft defining an axially directed shoulder; a switch having means operatively associated with said shoulder and responsive to axial movement thereof for operating said switch in response to axial movement of said shaft; and a pivotally supported bell-crank having a pair of arms, one of which arms is adapted at its outer end to receive an external force for pivoting said bell-crank, and the other of which arms has a bearing portion engageable with said shoulder for shifting said shaft axially from a first to a second shaft position for thereby operating said switch.

6. A shaft-control structure for a timer comprising in combination: a sequence cam; a rotatably-supported axially-slidable timer shaft having a driving connection with the sequence cam for joint rotation; means on said timer shaft defining an axially directed shoulder; a switch having means operatively associated with said shoulder and responsive to axial movement thereof for operating said switch in response to axial movement of said shaft; and a pivotally supported bell-crank having a pair of arms, one of which arms is adapted at its outer end to receive an external force for pivoting said bell-crank, and the other of which arms has an apertured bearing portion receiving said timer shaft and engageable with said shoulder for shifting said shaft axially from a first to a second shaft position for thereby operating said switch.

7. A shaft-control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; means on said timer shaft defining an axially directed shoulder; a switch having means operatively associated with said shoulder and responsive to axial movement thereof for operating said switch in response to axial movement of said shaft; a fixedly supported rigid member secured against said support surfaces, said member having an abutment portion extending between said support surfaces; and a bell-crank having a pair of arms, one of which arms is responsive at its outer end to an external force directed substantially normal to said shaft for pivoting said bell-crank on said abutment portion, and the other of which arms has an apertured bearing portion receiving said timer shaft and engageable with said shoulder for shifting said shaft axially from a first to a second shaft position for thereby operating said switch.

8. A shaft-control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; means on said timer shaft defining an axially directed shoulder; a switch having means operatively associated with said shoulder and responsive to axial movement thereof for operating said switch in response to axial movement of said shaft; a fixedly supported rigid member secured against said support surfaces, said member having an abutment portion extending between said support surfaces; and a bell-crank having a pair of arms, one of which arms is responsive at its outer end to an external force directed substantially normal to said shaft for pivoting said bell-crank on said abutment portion, and the other of which arms has an apertured bearing portion receiving said timer shaft and said switch operating means, said bearing portion being directly engageable with said shoulder for shifting said shaft axially from a first to a second shaft portion for thereby operating said switch.

9. A shaft-control structure for a timer comprising in combination: a sequence cam; a rotatably-supported axially-slidable timer shaft having a driving connection with the sequence cam for joint rotation; means on said timer shaft defining an axially directed shoulder; a switch having means operatively associated with said shoulder and responsive to axial movement thereof for operating said switch in response to axial movement of said shaft; a pin fixedly secured to said timer shaft for rotation therewith and extending radially therefrom; a fixedly supported rigid member having a rigid cam track disposed in the path of said pin and engageable with said pin when said timer shaft is in a first axial position, and operative thereon in response to shaft rotation to shift said timer shaft to a second axial position, for thereby operating said switch; and means responsive to an external force and operatively engageable with said shaft shoulder when said timer shaft is in said first axial position for shifting said shaft axially to said second axial position at any angular position of said shaft and pin for thereby operating said switch.

10. A shaft-control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; said shaft having at least one axially directed cam shoulder defining a circumferentially directed recess; a spring carried by said housing and having at least one resilient finger tangentially receivable in said recess, said finger being yieldable radially of said shaft in response to axial movement thereof; means on said timer shaft defining an axially directed shoulder; a switch having means operatively associated with said shoulder and responsive to axial movement thereof for operating said switch in response to axial movement of said shaft; a fixedly supported rigid retaining member secured against said support surfaces, said member having a generally U-shaped abutment portion extending between said support surfaces and engageable at the closed end of the U-shape with said spring in a direction parallel to the axis of said shaft for retaining said spring against movement parallel to the shaft axis; and means responsive to an external force and operatively engageable with said shoulder for shifting said shaft axially from a first to a second shaft position for thereby operating said switch; said finger being received in said recess to define one of said axial shaft positions.

11. A shaft control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; said shaft having at least one axially directed cam shoulder defining a circumferentially directed recess; a spring carried by said housing and having at least one resilient finger tangentially receivable in said recess, said finger being yieldable radially of said shaft in response to axial movement thereof; means on said timer shaft defining an axially directed shoulder; a switch having means operatively associated with said shoulder and responsive to axial movement thereof for operating said switch in response to axial movement of said shaft; a fixedly supported rigid retaining member secured against said support surfaces, said member having a generally U-shaped abutment portion extending between said support surfaces and engageable at the closed end of the U-shape with said spring in a direction parallel to the axis of said shaft for retaining said spring against movement parallel to the shaft axis; and a bell-crank supported by said timer shaft for pivoting against said abutment portion remotely from said spring, said bell-crank being responsive to an external force and operatively engageable with said shoulder for shifting said shaft axially from a first to a second shaft position for thereby operating said switch; said finger being received in said recess to define one of said axial shaft positions.

12. A shaft-control structure for a timer comprising in combination: a housing having a shaft aperture extending through a side thereof, said housing having a pair of raised outwardly directed support surfaces adjacent to said aperture and disposed on opposite sides thereof; a sequence cam disposed in said housing; a timer shaft rotatably-supported by and axially-slidable within said aperture and having a driving connection with the sequence cam for joint rotation; said shaft having at least one axially directed cam shoulder defining a circumferentially directed recess; a spring carried by said housing and having at least one resilient finger tangentially receivable in said recess, said finger being yieldable radially of said shaft in response to axial movement thereof; means on said timer shaft defining an axially directed shoulder; a switch having means operatively associated with said shoulder and responsive to axial movement thereof for operating said switch in response to axial movement of said shaft; a pin fixedly secured to said timer shaft for rotation therewith and extending radially therefrom; a fixedly supported rigid retaining member secured against said support surfaces, said member having a generally U-shaped abutment portion extending between said support surfaces and engageable at the closed end of the U-shape with said spring in a direction parallel to the axis of said shaft for retaining said spring against movement parallel to the shaft axis; a rigid cam track disposed in the path of said pin and engageable with said pin when said timer shaft is in a first axial position, and operative thereon in response to shaft rotation to shift said timer shaft to a second axial position, for thereby operating said switch; said finger being received in said recess to define one of said axial shaft positions; and means responsive to an external force and operatively engageable with said shaft shoulder when said timer shaft is in said first axial position for shifting said shaft axially to said second axial position at any angular position of said shaft and pin for thereby operating said switch.

13. In a timer structure having a housing, a shaft rotatably and axially slidably carried by said housing, said shaft having a circumferential recess and a radial projection, a spring carried against said housing and having a resilient finger tangentially receivable in said recess, a first switch in said housing and including an elongated operating lever, and a second switch in said housing responsive to axial movement of said shaft, the improvement, in combination therewith, of a bell-crank supported by said shaft and pivotally responsive to an external force and having an operative connection with said shaft for effecting an axial shift thereof, and a unitary rigid member secured to said housing and adapted to retain said spring, to pivotally support and guide said lever, to react on said radial projection for shifting said shaft axially at a preselected angular position, and to provide a fulcrum for pivoting said bell-crank.

14. In a timer structure having a housing, a shaft rotatably and axially slidably carried by said housing, said shaft having a circumferential recess and a radial projection, a spring carried against said housing and having a resilient finger tangentially receivable in said recess, and a switch in said housing responsive to axial movement of said shaft, the improvement, in combination therewith, of a bell-crank supported by said shaft and pivotally responsive to an external force and having an operative connection with said shaft for effecting an axial shift thereof, and a unitary rigid member secured to said housing and adapted to retain said spring, to react on said radial projection for shifting said shaft axially at a preselected angular position, and to provide a fulcrum for pivoting said bell-crank.

References Cited in the file of this patent

UNITED STATES PATENTS

| | | |
|---|---|---|
| 2,585,018 | Kreitchman et al. | Feb. 12, 1952 |
| 2,603,725 | Dietrich | July 15, 1952 |
| 2,703,347 | Constantine | Mar. 1, 1955 |
| 2,825,772 | Jones | Mar. 4, 1958 |
| 2,971,143 | Stillwell | Feb. 7, 1961 |